United States Patent Office 2,852,202
Patented Sept. 16, 1958

2,852,202

COFFEE GRINDER

Adolf Ditting and Walter Engi, Zurich, Switzerland; said Engi assignor to said Ditting Application November 12, 1954, Serial No. 468,508

Claims priority, application Switzerland April 28, 1954

3 Claims. (Cl. 241—245)

This invention relates to a coffee grinder and refers more particularly to an attachment to or a device for coffee grinders which permits to convey ground coffee from the grinding discs to a container, such as a paper bag.

It is an object of the present invention to provide means in a coffee grinder which permit to convey automatically ground coffee to a container subsequently to the grinding operation.

A further object of the present invention is the provision of means in a coffee grinder, whereby the ground coffee may be conveyed to a bag or other container with a minimum loss of ground coffee particles.

Still another object of the present invention is to provide means in a coffee grinder which substantially prevent the coffee particles from adhering to the internal walls of the grinder.

A further object of the present invention is the provision of means in a coffee grinder which serve for the automatic filling of a container with ground coffee subsequently to the grinding operation.

The present invention is characterized by the fact that between the two grinding discs and their supports at least one wiper blade is arranged peripherally of the said supports, which wiper blade scrapes the ground coffee from the wall of the grinder housing and forces it through an opening arranged in the said housing. This opening is disposed at an acute angle to the tangent to the inner wall of the said housing, while a tube is vibratably arranged at the exterior wall of the housing, said tube serving as a bag holder into the bore of which the said slot opens tangentially so that the tube operates as a cyclone.

An embodiment of the invention is shown in the enclosed drawings, in which.

Figure 1:
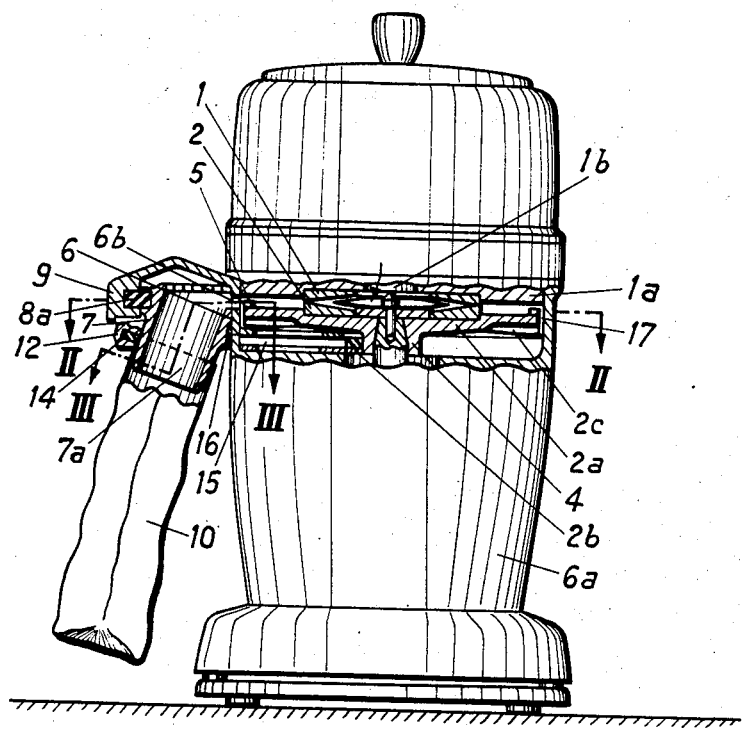
Fig. 1 shows a coffee grinder partly in section along line B—B of Fig. 2.
Figure 2:
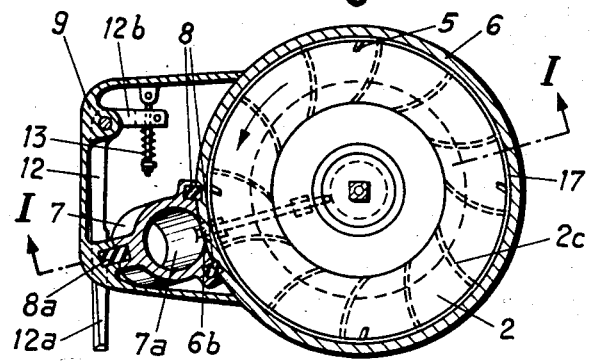
Fig. 2 is a section along line A—A of Fig. 1.
Figure 3:
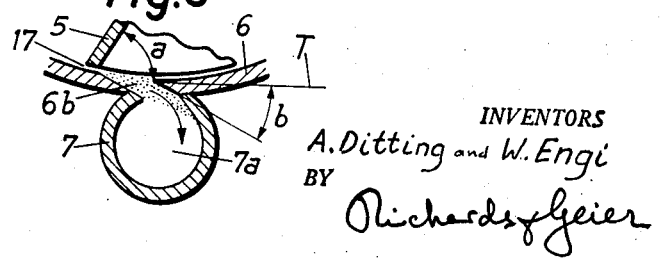
Fig. 3 is an enlarged detail view of a wiper blade, the outlet passage for the ground coffee and the bag holding tube.

In the coffee grinder shown in the drawing the coffee beans filled into the grinder enter through the central opening 1b of the stationary grinding disc 1 the space between the stationary grinding disc 1 attached to support 1a and the rotating grinding disc 2 connected to the driven supporting disc 2a and arranged in directly opposed relation with respect to the stationary grinding disc. Between the grinding disc supports e. g. four wiper blades 5 are arranged and attached to the upper side of the rotating grinding disc holder 2a. The said wiper blades are arranged at an acute angle $a$ to the tangent T of the disc periphery and spaced circumferentially from each other. In the wall 6 of the housing 6a of the grinder, which encloses the disc 1 and 2, an opening 6b also arranged at an acute angle $b$ to tangent T. The blades 5 scrape the ground coffee from the wall of housing 6a and force it through the opening 6b, which is arranged at an acute angle thereto, into tube discharge 7. Advantageously only one to four wiper blades 5 are provided on the circumference so that a certain amount of ground coffee becomes deposited in front of the said blades and is intermittently ejected in such a manner as to prevent it from binding to the tube wall. The tube 7 is resiliently attached or supported by rubber pads, or the like. Two rubber pads 8 connect the tube 7 at one end thereof to the housing 6a while one pad 8a is supported by the housing extension 9 and connects the tube with the latter. The housing extension 9 is rigidly connected to the wall 6 of the grinder housing 6a. The tube 7 is arranged on the housing 6a in such a manner that the slot 6b is in alinement with the bore 7a of the tube 7 so that the latter operates as a cyclone through which the ground coffee ejected circulates along the inner wall of the tube and drops into the bag 10. In the extension 9 adjacent the other downwardly projecting end a knee lever 12 constituting the bag holding means is provided of which the arm 12a is formed as a handle while the arm 12b is acted upon by pressure spring 13. Arm 12 is equipped with a rubber insert 14 which serves to clamp a bag 10 against the tube 7.

The resilient mounting of the tube 7 by means of the rubber pads 8 and 8a enables the tube 7 to vibrate. Any means may be employed to vibrate the said tube; the hub 4 of the rotating holding disc 2a may, by way of example, be provided with a cam 2b sliding under the transmission means or boss 15 which in turn bears against the tube 7 with its front end via a rubber member 16. During the grinding process the tube 7 is therefore vibrated so as to prevent the ground coffee from adhering to the inner wall surfaces of the bag and to facilitate the filling of the bag attached thereto.

The path of the ground coffee between the wiper blades 5 and the interior bore 7a of the tube 7 is a very short one and corresponds to the length of the bore 6b. Accordingly there is no possibility of a larger quantity of ground coffee adhering to the bore and not being forced into the bag 10. In order to permit the rotating grinding disc to freely rotate in the housing 6 the latter encloses the rotating grinding disc with a clearance 17. To prevent ground coffee from passing through this clearance and entering the space below the rotating grinding disc 2, i. e. its supporting disc 2a, the latter is provided at its lower side with a plurality of impeller blades 2c, disposed circumferentially thereon. Upon rotation of disc these impeller blades will cause a current or flow of air from the space below the supporting disc 2a through the clearance 17, which will prevent passage of the ground coffee therethrough. In addition, this air while escaping from the housing 6 through the bore 6b, will entrain particles of ground coffee and thereby aid in their discharge into the bag. In order to pass the last remnant of any ground coffee adhering to the tube 7 into bag 10, the lever 12a may be actuated against the action of spring 13 and released to operate as a knocking hammer for tube 7, the vibration causing the last remnants of ground coffee to drop into the bag 10.

Having now particularly described and ascertained the nature of our said invention and in what manner the same is to be performed, we declare that what we claim is:

1. In a coffee grinder, a stationary grinding disc, a directly opposed rotating grinding disc, a plurality of wiper blades carried on one side of said rotating grinding disc and spaced circumferentially thereon, a housing supporting and enclosing said discs and having a slot extending substantially tangentially therethrough, said slot being in alinement with one side of said rotating grinding disc, said housing enclosing said rotating disc with a clearance, a plurality of impeller blades disposed circumferentially on said rotating grinding disc on the other side thereof, said impeller blades supplying an air current through said clearance to said one side of the rotating disc, whereby said air current aids in circulating and discharging said ground coffee through said slot, a discharge tube, a housing extension connected to said housing adjacent said slot and enclosing one end of said discharge tube, the other end of said discharge tube projecting downwardly therefrom, said discharge tube being in communication with said slot, and bag holding means adjacent said projecting end for the filling of a bag through the discharge tube.

2. A coffee grinder attachment according to claim 1, comprising vibrating means for said discharge tube and including cam means carried by said rotating grinding disc for rotation therewith and transmission means intermediate and in contact with said cam means and said discharge tube, respectively, whereby said cam means upon rotation thereof cause vibration of said transmission means and via the latter of said discharge tube.

3. A coffee grinder attachment according to claim 2, said vibrating means further comprising resilient pads interconnecting said discharge tube with said housing and with said housing extension to thereby permit vibration of said discharge tube with respect to said housing upon rotation of said cam means.

References Cited in the file of this patent

UNITED STATES PATENTS

| 417,423 | Hobler | Dec. 17, 1889 |
| 1,816,050 | Lee | July 28, 1931 |
| 1,969,899 | Nielsen | Aug. 14, 1934 |
| 2,090,634 | Meeker | Aug. 24, 1937 |

FOREIGN PATENTS

| 520,981 | Germany | Mar. 16, 1931 |